United States Patent

[11] 3,538,825

[72] Inventor  Daniel G. Taylor
              Minneapolis, Minnesota
[21] Appl. No. 704,597
[22] Filed     Feb. 12, 1968
[45] Patented  Nov. 10, 1970
[73] Assignee  Honeywell Inc.
              Minneapolis, Minnesota
              a corporation of Delaware

[54] PHOTOGRAPHIC FLASH APPARATUS
     7 Claims, 9 Drawing Figs.
[52] U.S. Cl. .................................................. 95/11,
                                                         240/1.3
[51] Int. Cl. .......................................... G03b 15/03
[50] Field of Search ................................. 95/11(Misc.),
                                              11.5, 11(Lomp); 240/1.3

[56]              References Cited
              UNITED STATES PATENTS
3,312,086  4/1967  Casebeer et al. .............  95/11.5X
3,456,101  7/1969  Rentschler et al. ............  240/1.3

Primary Examiner—John M. Horan
Assistant Examiner—Fred L. Braun
Attorney—Arthur H. Swanson and Lockwood D. Burton ABSTRACT: A photoflash device having a light-blocking member for controlling the effective light output of a flashlamp during an exposure. The light-blocking member includes a pair of pivotably mounted shutter blades, a latch element, and a control circuit for initiating movement of the shutter blades to the light-blocking position. The shutter blades are mounted between the flashlamp and the object being photographed, and are held in the open or light-transmitting position by the latch element. The control circuit has a light-sensing element for sensing that portion of the light which is emitted by the flashlamp and reflected from the object being photographed, and an electromagnet for moving the latch element to its release position in response to the signal produced by the light-sensing element. Upon release of the latch element, the shutter blades move to the light-blocking position to prevent further passage of any light which may be emitted by the flashlamp toward the object.

Patented Nov. 10, 1970
3,538,825
Sheet 1 of 2
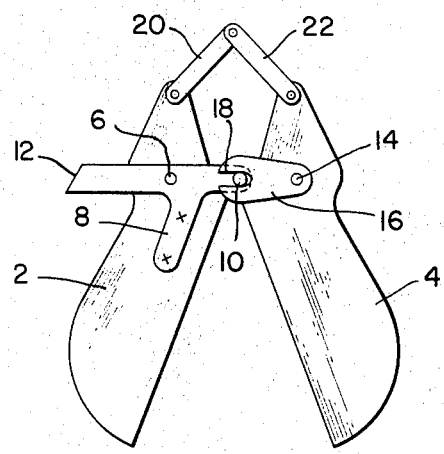
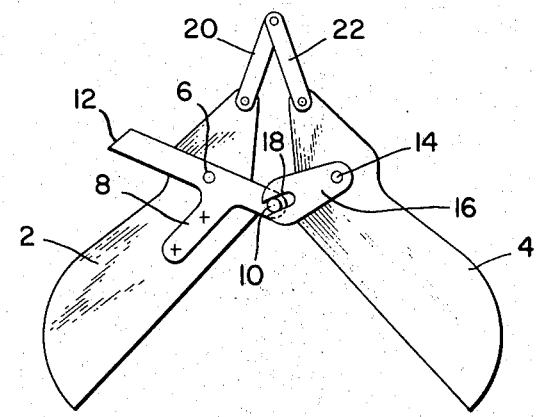
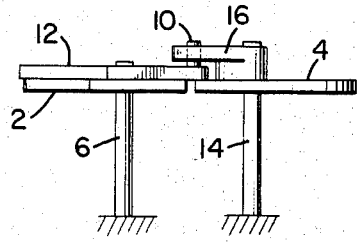
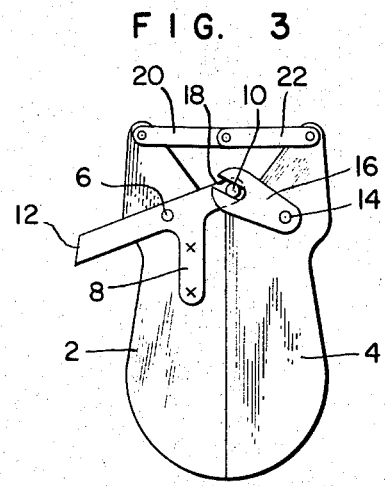
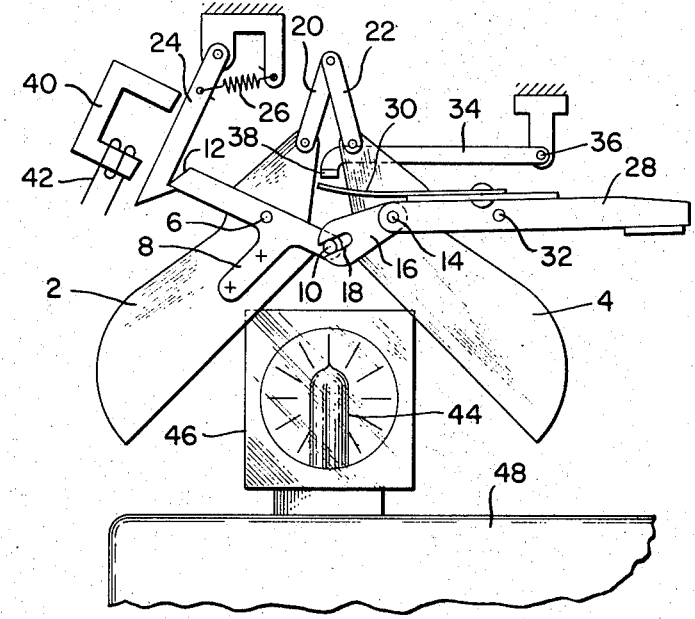
INVENTOR.
DANIEL G. TAYLOR
BY *Lockwood D. Barton*
ATTORNEY.

Patented Nov. 10, 1970

INVENTOR.
DANIEL G. TAYLOR
BY Lockwood D. Burton
ATTORNEY.

PHOTOGRAPHIC FLASH APPARATUS

In the art of flash photography means have heretofore been provided whereby, in the case of electronic flash devices, the time duration of the flash is controlled in accordance with the demand as determined by the film speed, diaphragm opening and a distance to the photographic object. Those devices actually quench the flashtube by short-circuiting the flashtube energy source, thereby assuring that the proper amount of light for a good picture is obtained, minimizing the probability of overexposure.

On the other hand, most tyro photographers use the more conventional flashbulbs. While many efforts have been made to make photography for such users as simple as possible, no comparable means have been provided for bulb-type flash devices. Such tyro photographers are those most in need of age in making acceptable photographs.

Accordingly, it is an object of the present invention to provide an improved photoflash control means which obviates the foregoing shortcomings.

It is another object of the present invention to provide an improved photoflash device as set forth which is usable and reusable with conventional flashbulbs.

It is a further object of the present invention to provide a flash control means for bulb-type flash devices wherein auxiliary means are provided for effectively cutting off the light from the source after a time interval determined by the demand of the conditions.

Yet another object of the present invention is to provide an improved flash control means as set forth which includes a novel, high-speed, mechanical shutter means.

In accomplishing these and other objects there has been provided, in accordance with the present invention, for association with the photographic camera having a photoflash apparatus including flashbulb means for illuminating an object to be photographed, means for sensing the light reflected from the object of the camera for producing a corresponding signal. That signal is integrated to produce a control signal. The control signal is, in turn, used to control the actuation of a light cutoff means. The light cutoff means includes a novel, two-part shutter mechanism, the shutter mechanism features a novel actuating mechanism which takes advantage of the natural frequency of oscillation of the elements to produce a system which may be operated at high speeds while minimizing the self-destructive characteristics normally incident to such high high-speed operation.

A better understanding of the present invention may be had from the following detailed description when read in connection with the accompanying drawings, in which:

FIGS. 1, 2 and 3, are illustrative of the main operative portions of a shutter constructed in accordance with the present invention, the three views representing the apparatus in three operative portions;

FIG. 1A is a front view of the apparatus shown in FIG. 1, to illustrate the attached torsion bar springs;

FIGS. 4, 5, 6 and 7 are similar views of the shutter mechanism in association with operative control elements, showing the apparatus in various stages of operation.

Figure 6:
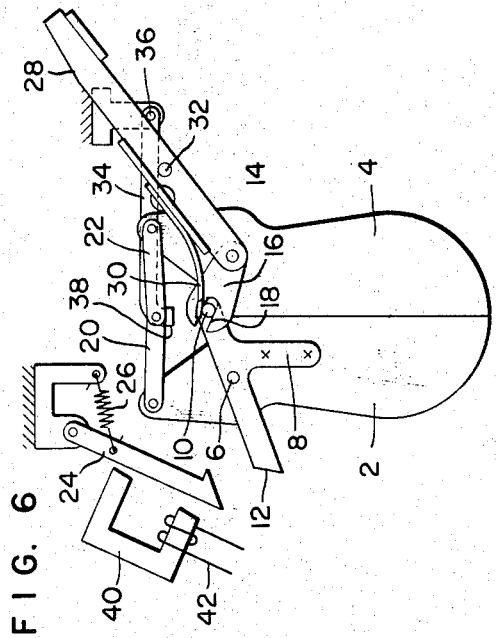

Referring now to the drawings in more detail there is shown in FIG. 1, the fundamental elements of the shutter constructed in accordance with the present invention. The shutter includes a first leaf member 2 and a second leaf member 4. Each of the two leaf members are constructed of a relatively thin, light weight, opaque, sheet material such, for example, as aluminum. The first leaf member 2 is pivoted about a point at which it is securely fastened to the end of a torsion bar spring 6. Secured to the leaf member 2 and embracing the pivot or torsion bar spring 6 is a stiffening element 8. The stiffening element 8 is formed of a substantially thicker rigid material. One end of the stiffening element 8 extends toward the opposite leaf member 4 and carries a coupling pin 10. Another portion of the stiffening element 8 extends outwardly and beyond the periphery of the first member 2 and constitutes a catch member 12 to be more fully described hereinafter. The second leaf member 4 is similarly, firmly secured to a pivot torsion bar spring 14. A rigid stiffening element 16 is secured to the second leaf member 4 embracing the pivot point 14. The stiffening member 16 extends toward the first leaf member 2 and includes in the ends thereof a slot 18. The coupling pin 10 secured to the stiffening member 8 on the first leaf member 2 is positioned within the slot 18 and is adapted to move back and forth therein as the leaf members 2 and 4 are pivoted about their respective pivot springs 6 and 14, respectively. Further, a portion of each of the leaf members 2 and 4 extend a short distance in the opposite direction from the operative or shutter end of the two leaf members. These extensions are connected by a toggle linkage comprising a first link arm 20 and a second link arm 22 in FIG. 1 a the several elements are shown in the position they occupy when no force or energy is stored in the torsion bar springs 6 and 14, respectively. This constitutes an intermediate position. In FIG. 2 the elements are shown in a fully opened position in which position energy is stored in the torsion springs 6 and 14, respectively. The shutter mechanism must be latched to maintain this open position, as will be more fully shown hereinafter. In FIG. 3 the elements are shown in a fully closed position. It should be noted that in this position the toggle links 20 and 22 are substantially dead centered. In this position, also, energy is stored in the torsion springs 6 and 14 substantially in the same amount as that in the position shown in FIG. 2 but in opposite sense. FIGS. 1, 2 and 3 show the principal operating elements of the shutter mechanism in three important positions, in simplified detail, such that the relative position and relationships of the several parts may be clearly seen without the details being obscured by the associated mechanisms. The fixed points about which the leaf members 2 and 4 pivot are the ends of the torsion springs 6 and 14, respectively.

It has been determined that for successful operation as a light-emitting shutter the mechanism should be capable of being moved from a fully open to a fully closed position in 1 msec. It has also been determined that if such motion were accomplished through a unidirectional application of force the parts of the shutter would be traveling at a tremendous velocity at the point of closure; which velocity would be suddenly arrested at that point of closure. That arrangement would result in such excessive stress in the elements as to become self-destructive. This, in turn, would result in an instrumentality having a very short useful life.

In accordance with the present invention means are provided whereby the movable elements of the shutter mechanism are moved from fully open to fully closed position in 1 msec. and yet provides substantially zero terminal velocity. This is accomplished through mechanically tuning the movable elements with the torsion springs 6 and 14 to provide a vibratory system with a natural frequency of oscillation of substantially 500 c.p.s. (the fully open to fully closed position representing one-half cycle). Thus, the intermediate position shown in FIG. 1 is the normal or unstressed position for the springs 6 and 14. When the apparatus is biased to the open position shown in FIG. 2 energy is stored in the springs 6 and 14. When the shutter mechanism is released from the fully opened position, the energy stored in the torsion springs 6 and 14 is released and accelerates the leaf members 2 and 4 toward the closed position. Energy from the torsion springs 6 and 14 continues to be released in accelerating the leaf members toward the closed position until that energy is expended at a position which corresponds to that shown in FIG. 1, i.e. the normal unstressed position. The inertia of the system causes the leaf members 2 and 4 to continue in their motion towards the closed position shown in FIG. 3. However, as the motion continues beyond that shown in FIG. 1, the torsion springs 6 and 14 absorb energy from the moving parts causing these parts to decelerate in their motion. Because the system is mechanically tuned, the inertia or kinetic energy of the moving parts is completely absorbed and stored by the torsion springs 6 and 14 just at the point of closure of the leaf members 2 and 4, in the position shown in FIG. 3. Under such conditions, the moving elements will have reached a condition of substantially zero velocity just at the point of closure. The shutter member is held in the closed position by the dead-centered relationship of the links 20 and 22, also as shown in FIG. 3. The energy stored in the torsion springs 6 and 14, when the shutter is in the closed position, is used, as will be shown hereinafter, to return the shutter to its fully opened position.

In FIGS. 4 through 7, the shutter mechanism is the same as that shown in FIGS. 1 through 3. However, in FIGS. 4 through 7, there is also shown illustrative means for actuating the shutter mechanism. In FIG. 4, the shutter mechanism is shown in its fully opened position corresponding to that shown in FIG. 2. Here, however, there is also shown a latch member 24. The latch member 24 cooperatively engages the catch member 12 when the shutter is in the fully opened position, to hold the shutter in that position against the force of the torsion springs. The latch member 24 is biased into engagement with the catch member 12 by a bias spring 26.

There is also shown a cocking lever 28 which is mounted for pivotal movement about the fixed axis of the shutter leaf member 4, that is, about the axis of the torsion spring 14. It should, of course, be noted that the lever 28 is mounted for free pivotal movement about the axis and is not connected to impart any force or motion or mass to the spring 14. Secured to the lever 28 is a leaf spring 30 which extends by beyond the pivoted end of the lever 28. The function of this spring will be more fully described hereinafter. Also secured to the lever 28 is a transversely extending pin or boss 32. Slightly displaced from but substantially parallel to the lever 28 is a toggle camming lever 34. The lever 34 is pivoted about a fixed pivot 36 and has at its opposite end a tab 38 which underlies the junction between the toggle links 20 and 22. As will be shown hereinafter, this lever is used to cam the toggle links 20 and 22 out of their dead center or latched position.

Associated with the latch member 24 there is a release solenoid 40 having a winding 42 thereon. With the shutter mechanism latched in its fully opened position, as shown in FIG. 4, no impediment is provided to the light issuing from the flashbulb 44, shown mounted in a so-called flashcube 46. The flashcube 46 is, in turn, mounted on a camera body 48, here shown in fragmentary form.

Figure 5:
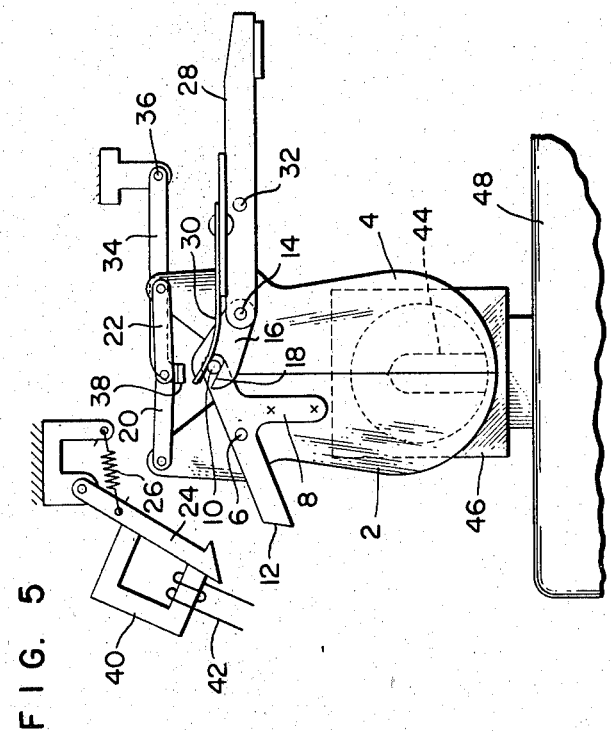

When the photographer has pressed the shutter releasebutton (not shown) to initiate the taking of a picture, the camera shutter is opened and the flashbulb 44 is ignited. When sufficient light has been reflected from the object of the photograph back to the camera, that reflected light is sensed by means hereinafter described, and a circuit actuated to apply a signal pulse to the winding 42 on the solenoid 40. When the solenoid 40 is thus energized, the latch member 24 is moved to a position whereat the catch means 12 is released. The release of the catch means 12 allows the shutter leaf members 2 and 4 to be closed, as hereinbefore described, to the position shown in FIG. 5. In the closed position as shown in FIG. 5 the light issuing from the flashbulb 44 is completely blocked. It should be noted that during the closing of the shutter leaf members 2 and 4 the levers 28 and 34 with their associated parts in no way enter or interfere with the movement of the leaf members toward the closed position.

If there were no friction or other mechanical losses in the system, releasing the toggle links 20 and 22 from their dead centered position would allow the energy stored in the torsion springs 6 and 14 to return the leaf members 2 and 4 to their fully opened position such as that shown in FIG. 4. However, there are such losses. Accordingly, in order to overcome these losses, a small amount of additional energy must be imparted to the movement of the leaf members in order to return the shutter mechanism to its fully opened and latched position. To this end, the leaf spring 30 just engages the coupling pin 10 when the lever 28 is in its normal or unactivated position as shown in FIG. 5. It will be recalled that the leaf members of the shutter are held in their closed position by the dead-centered relation of the toggle links 20 and 22. The junction of these toggle links, in the position shown in FIGS. 5 rests on the tab 38 of the toggle camming lever 34.

Figure 7:
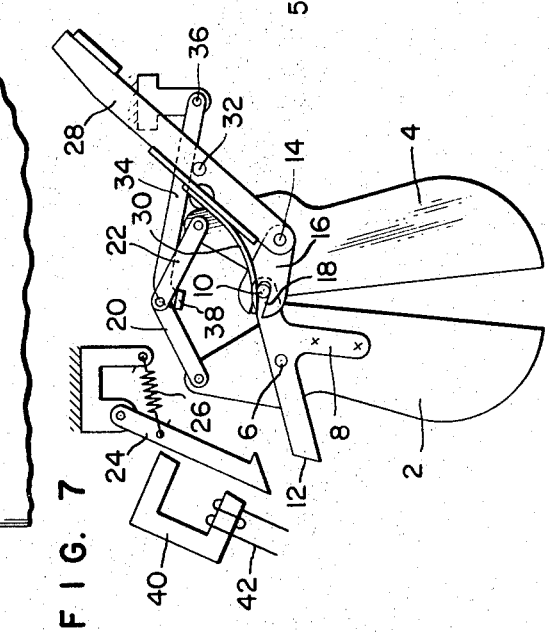

To reset or cock the shutter to its fully opened position, the cocking lever is moved in a counterclockwise direction, as shown in the drawings, about the pivot point 14. The initial part of this counterclockwise movement of the cocking lever 28 causes the end of the leaf spring 30 to bear against the coupling pin 10 and to be deflected thereby, thus storing energy in the spring 30. This relationship is shown in FIG. 6. In this position, the toggle links 20 and 22 are still in their dead-centered relationship maintaining the shutter assembly in its closed position. As the counterclockwise movement of the cocking lever 28 is continued, the pin or boss 32 carried by the lever 28 engages the edge of the toggle-camming lever 34 causing that lever to move in a clockwise direction, as viewed in the drawings, about its pivot 36. As shown in FIG. 7, this clockwise motion of the lever 34 causes the tab 38 to engage and cam the junction of the toggle linkage upward, out of its dead-centered relationship. As soon as the toggle links 20 and 22 are cammed out of their dead-center relationship, the energy stored in the torsion bar springs 6 and 14 is released, causing the leaf members 2 and 4 to begin moving towards the fully opened position. Augmenting the energy of the springs 6 and 14 is the energy stored in the spring 30. The spring 30 pressing downward on the pin 10 also tends to cause the leaf members 2 and 4 to move toward the fully opened position. The augmentation afforded by the spring 30 is sufficient to overcome the mechanical losses in the mechanism. Accordingly, as soon as the tab 38 cams the toggle links 20 and 22 out of the dead-centered position, the combined energy of the springs 6, 14 and 30 causes the shutter leaf members to move to the completely opened position, including the engagement of the latch and catch assembly, to the position shown in FIG. 5.

Figure 8:
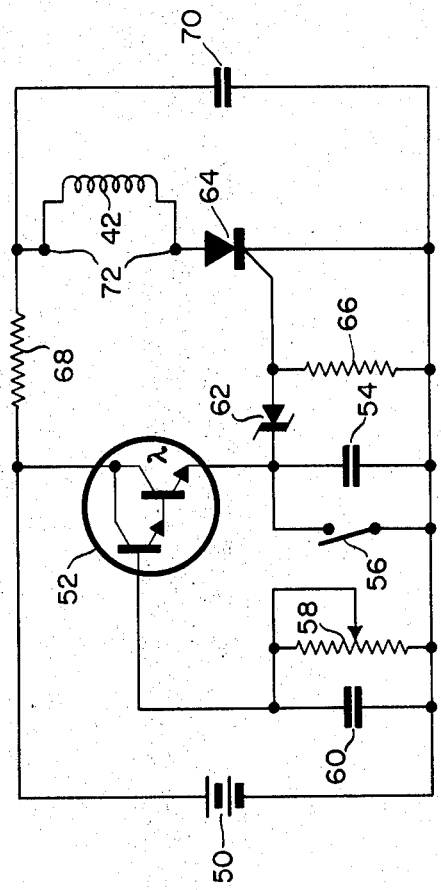
FIG. 8 is a schematic circuit diagram of a light-sensitive control circuit for controlling the operation of the apparatus shown in FIGS. 1 through 7.

In FIG. 8 there is shown a schematic representation of a circuit suitable for use in controlling the energization of the solenoid 40. This circuit includes a power supply 50 which, for example, may be the power supply or battery pack contained within the body of the camera and which is used to fire the flashbulb 44. Means for detecting the quantity of light reflected from the object of the photograph is illustrated as a photosensitive transistor 52 in a so-called Darlington configuration. This photosensitive transistor is characterized in that the current flowing through the cell is controlled in accordance with the amount of light impinging thereon. The collector of the photosensitive transistor combination is connected to the positive terminal of the power supply 50. The emitter of the photosensitive transistor 52 is connected through an integrating capacitor 54 to the other terminal of the power supply 50. A switch 56 is connected across the electrodes of the integrating capacitor 54. Base bias for the transistor 52 is provided by an adjustable resistor 58 connected in series between the base electrode of the transistor 52 and the negative side of the power supply 50. A filter capacitor 60 is connected across the resistor 58. The emitter of the transistor 52 is connected through a Zener diode 62 to the gate electrode of a silicon controlled rectifier 64. A bias resistor 66 is connected between the gate electrode of the silicon controlled rectifier 64 and the negative side of the power supply. The cathode of the silicon controlled rectifier 64 is also connected to the negative side of the power supply. A blocking resistor 68 is connected between the positive side of the power supply and a first electrode of a storage capacitor 70; the other electrode of the capacitor 70 is connected to the negative side of the power supply 50. A pair of output terminals 72 are connected, respectively, to the anode of the silicon controlled rectifier and the junction between the resistor 68 and the storage capacitor 70. Across these output terminals 72 there is connected the winding 42 of the solenoid 40.

In operation, the switch 56 is normally closed, short circuiting the capacitor 54. This switch may be synchronized to open with the shutter of the camera. As the camera shutter opens, the flashbulb is fired, illuminating the object of the photograph. Light reflected from the object falls on the photosensitive transistor 52, causing current to flow therethrough in accordance with the intensity and duration of the light incident thereon. This current flowing through the transistor 52 charges the capacitor 54. As the capacitor 54 is charged, the voltage thereacross increases until it reaches the breakdown potential of the Zener diode 62. When the Zener diode 62 breaks down, a signal is applied to the gate electrode of the silicon controlled rectifier 64.

In the static condition, the capacitor 70 is fully charged from the power supply 50 through the resistor 68. As the triggering signal is applied to the gate electrode of the silicon controlled rectifier 64, the silicon controlled rectifier is caused to conduct. The conduction of the silicon controlled rectifier 64 causes the capacitor 70 to be discharged through the winding 42. That current is sufficient to actuate the solenoid 40, thereby releasing the shutter mechanism.

It should be apparent that a predetermined amount of light reflected from the object of the photograph is necessary to effect a triggering of the silicon controlled rectifier. This quantity of light is, of course, correlated with the amount of light necessary to properly expose the film in the camera. Since various film speeds are available even for inexpensive cameras, it is desirable that the rate of charging the capacitor 54 be adjustable to accommodate such variations in film speed.

In this circuit, the control of charging rate of the capacitor 54 is effected by adjusting the base bias on the transistor 52 by means of the adjustable resistor 20.

Thus, it may be seen that there has been provided, in accordance with the present invention an improved photoflash control means which automatically controls the amount of light emanating from a flashbulb to illuminated the object of a photograph by interposing a shutter means between the light source and the object after a time interval determined by the demand of the conditions.

I claim:

1. In a photoflash system wherein an object to be photographed is illuminated by a flashbulb, the improvement comprising shutter means positioned between said flashbulb and said object, said shutter means comprising a spring-driven mechanical shutter having a latch means and a signal-controlled latch release mechanism, said shutter being operable to interrupt the flow of light from said flashbulb toward said object, and means responsive to a predetermined amount of light reflected from said object to produce a control signal for controlling the release of said latch release mechanism whereby to actuate said shutter, and wherein said mechanical shutter includes a first and second opaque leaf member, said first leaf member being mounted for limited rotational movement about a first fixed pivot point, first torsion bar spring means secured to said first leaf member at said first pivot point, said second leaf member being mounted for limited rotational movement about a second pivot point, second torsion bar spring means secured to said second leaf member at said second pivot point, said first and second leaf members being positioned adjacent each other with a closed condition of said shutter defining one limit of said rotational movement of said leaves and a fully open condition of said shutter defining an opposite limit of said rotational movement, and said torsion bar spring means being in an unstressed condition at a position of said leaf members intermediate said two limits.

2. The invention as set forth in claim 1 wherein said leaf member and said torsion bar springs comprise a vibratory system tuned to a predetermined natural frequency whereby to control the time required to effect a closure of said shutter.

3. The invention as set forth in claim 1 wherein said latch means is positioned to selectively hold said leaf members in said fully open condition.

4. The invention as set forth in claim 3 wherein further latch means are provided for selectively holding said shutter leaf members in said closed condition.

5. The invention as set forth in claim 4 wherein said further latch means comprises a toggle linkage connected between said first and second leaf members in position to be dead-centered when said leaf members are in said closed condition.

6. The invention as set forth in claim 5 wherein said leaf members and said torsion bar springs comprise a vibratory system tuned to a predetermined natural frequency whereby to control the time required to effect a closure of said shutter and characterized by the addition of cocking lever means for releasing said shutter from said closed condition.

7. The invention as set forth in claim 6 wherein said cocking lever means includes spring means positioned to initially store, the release, energy to said shutter as said cocking lever means is actuated whereby to augment the energy of said torsion bar springs in restoring said shutter to said fully open condition.